US006438981B1

(12) United States Patent
Whiteside

(10) Patent No.: US 6,438,981 B1
(45) Date of Patent: Aug. 27, 2002

(54) SYSTEM FOR ANALYZING AND COMPARING CURRENT AND PROSPECTIVE REFRIGERATION PACKAGES

(76) Inventor: Jay Daniel Whiteside, 3738 Piedra Creek, Corpus Christi, TX (US) 78410

( * ) Notice: Subject to any disclaimer, the term of this patent is extended or adjusted under 35 U.S.C. 154(b) by 0 days.

(21) Appl. No.: 09/588,703

(22) Filed: Jun. 6, 2000

(51) Int. Cl.[7] ............................................... F25B 49/02
(52) U.S. Cl. ...................................... 62/228.1; 62/129
(58) Field of Search ............................... 62/228.1, 125, 62/126, 127, 129, 130, 175, 510, 228.4, 228.5, 196.1, 196.2, 196.3

(56) References Cited

U.S. PATENT DOCUMENTS

| | | |
|---|---|---|
| 4,483,152 A | 11/1984 | Bitondo |
| 4,507,930 A | 4/1985 | Kaya |
| 4,611,470 A | 9/1986 | Enstrom |
| 4,768,346 A | 9/1988 | Mathur |
| 5,083,438 A | 1/1992 | McMullin |
| 5,195,329 A | 3/1993 | Lewis |
| 5,309,727 A | 5/1994 | Duff |
| 5,335,507 A | 8/1994 | Powell |
| 5,600,960 A | 2/1997 | Schwedler |
| 5,628,199 A | 5/1997 | Hoglund |
| 5,666,815 A | 9/1997 | Aloise |
| 5,761,916 A | 6/1998 | Oswalt |
| 5,809,795 A | 9/1998 | Beaverson |

OTHER PUBLICATIONS

"Wilson Building Submittals" by Total Sense Corporation, Jul. 20, 1999.
"Total Sense Corporation Invoice" and related correspondence and documents concerning the Wilson Building, Jun. 14, 1999.
Total Sense Corporation internal documents re costs, pricing and profits. Related to the Wilson Building, 1999.
Fax from Bob Winter to Total Sense Corporation and other potential investor related documents, Oct. 27, 1999.
Fax from Mandracchia/Hudson Tchnologies to Whiteside/Total Sense Corporation and related documents, Jul. 23, 1999.
Carrier–ARI Certified Performance Test–Celanese BG Project, and related signature pages, May 13, 1998.
MS860 Mcquay Systems Certified Centrifugal Chiller Rating Program, faxed 04–15–1999, Apr. 15, 1999, Oct. 24, 1996.
NCR to Victoria Air Conditioning re Del Mar TES/HP Project Submittals, Oct. 12, 1992.

*Primary Examiner*—Harry B. Tanner
(74) *Attorney, Agent, or Firm*—George S. Gray

(57) ABSTRACT

A system is provided that provides the operator of a refrigeration package, such as a water-chilling package, with both short term and long term economic and quantitative analyses of the operating chiller, comparing the existing performance to the hypothetical design rated performance of other chillers, using actual operating conditions and parameters under which the existing package operates. The system economically differentiates the future use of the existing chiller with respect to the future use of one or more prospective replacement chillers. The system performs such analyses using either historical evaporator tonnage and actual power usage data, or works in real time to provide a "snapshot" economic forecast, based on the immediate conditions. During real time monitoring of a wide variety of performance data, the system can also identify unsatisfactory performance conditions, i.e. faults, and provide the operator with onsite information as to the possible causes of, and potential solutions to, the unsatisfactory condition. The computer system and related hardware are provided, including that necessary to process and communicate the results of the analyses and monitoring to onsite displays, printers, data storage, and remote terminals and computers.

135 Claims, 9 Drawing Sheets

- Kw per ton - Fault
  - Unit low on refrigerant
  - Mechanical problem with the compressor
  - Unit is running out of it's efficiency range (too low of a load)
  - Evaporator is inefficient due to improper heat exchange (tubes fouled or oil logged)
  - Condenser is fouled and head pressure is to high
  - Electrical power imbalance
  - Check sensor calibration

Fig. 5

- Evaporator Approach - Fault

- Slimed or fouled tubes
  - Unit low on refrigerant
  - Water flow is incorrect
  - Water bypassing the division plate
  - Evaporator is inefficient due to improper heat exhange (Oil logged etc.)
  - Refrigerant metering devices malfunctioning or working improperly
  - Check sensor calibration

Fig. 6

- Condenser Approach - Fault

- Unit low on refrigerant
- Fouled tubes
- Improper water flow
- Water bypassing the division plate
- Check sensor calibration

Fig. 7

- Evaporator Water Flow - Fault
  - A valve is closed or pinched down too much
  - Water pump strainer clogged
  - Pump not performing to design capacity
  - Chilled water bypass not working properly
  - System operating control valves are causing chiller to run under too low of a load condition
  - Check sensor calibration

Fig. 8

- Condenser Water Flow – Fault
  - A valve is closed or pinched down too much
  - Water pump strainer clogged
  - Pump not performing to design capacity
  - Condenser water bypass not working properly
  - Tower water balance valves not allowing enough flow
  - Tower strainer clogged up
  - Condenser tubes badly scaled
  - Check sensor calibration

Fig. 9

SYSTEM FOR ANALYZING AND COMPARING CURRENT AND PROSPECTIVE REFRIGERATION PACKAGES

BACKGROUND OF THE INVENTION

1. Field of the Invention

The present invention relates generally to refrigeration equipment, and more specifically to a system for analyzing currently performing refrigeration equipment.

2. Description of the Prior Art

The general performance parameters of refrigeration equipment are well known, and the industry currently has various means to monitor and evaluate the performance of such equipment, including means involving computers.

A recent standard by the Air-Conditioning & Refrigeration Institute (ARI Standard 550/590, effective 1998) encompasses the performance principles of refrigeration equipment in the context of water-chilling packages using the typical vapor compression cycle. This standard, as it currently reads, is incorporated herein by reference, as if set forth herein verbatim.

From industry practice and the standard it is clear that a primary performance characteristic of a water-chiller package is the amount of power required to generate the appropriate evaporator tonnage, since the product of the evaporator is the chilled water which is routed for specific cooling tasks to other parts of the location, e.g. the offices and rooms. The prior art includes several examples of monitoring the actual power requirements for a given evaporator tonnage. For example, U.S. Pat. No. 5,083,438, by McMullin, issued in 1992, provided a system to monitor the performance of a water-chiller package, including examining its actual power requirements in light of its own design rated power requirements.

While the McMullin approach and other approaches may be suitable for the purposes for which they were designed, they would not be as suitable for the purposes of the present invention, as hereinafter described.

What is lacking in the prior art with respect to monitoring refrigeration packages, such as water-chilling packages, is the ability to assess the economic impacts of the existing performance against the chiller's own deign performance and the hypothetical performance of other chillers under the conditions existing at the time the existing chiller package is being evaluated. It is to the advantage of the operator, or owner, of such a water-chiller package to have a system that would monitor the water-chilling package, compare its power usage performance to its own design ratings, as well as, the design ratings of other chillers, that might be used to replace the one in operation. Such an economic comparison would enable the operator to make informed decisions as to the need to replace the existing water-chilling package with a different one, based on an analysis of how the prospective package would have performed under actual, historical operating conditions. Furthermore, current monitoring systems do not provide the communication of possible causes of, and potential solutions to, unsatisfactory conditions that are ascertained during the monitoring process.

SUMMARY OF THE PRESENT INVENTION

My invention provides a system, including computer hardware, computer software, and related apparatus, that assesses the economic impacts of the existing chiller performance against the chiller's own design performance and the hypothetical performance of other chillers under the conditions existing at the time the existing chiller package is being evaluated. The operator is provided a system that monitors the water-chilling package and compares its power usage performance to its own design ratings, as well as, the design ratings of other chillers that might be used to replace the one in operation. Such an economic comparison enables the operator to make informed decisions as to the need to replace the existing water-chilling package with a different one, based on an analysis of how the prospective package would have performed under actual, historical operating conditions. My system also provides the communication of possible causes of, and potential solutions to, unsatisfactory conditions that are ascertained during the monitoring process.

My invention includes a method for economically analyzing the performance of an operating first chiller with respect to the hypothetical design rated performance of at least one other chiller, the method comprising the steps of: (a) for the first chiller and for each of at least one designated time periods, obtaining at least one set of real tonnage derivation data, real power usage data, and cost per unit of power data; (b) obtaining other chiller information, including design rating information for each of the other chillers, the design rating information including the design rated power requirement; (c) deriving the power cost difference to operate the first chiller compared to at least one of the other chillers; and (d) economically differentiating the future use of the first chiller with respect to the hypothetical future use of the at least one other chiller.

My invention also includes a method for analyzing the performance of an first chiller with respect to the hypothetical design rated performance of at least one other chiller, the method comprising the steps of: (a) for the first chiller and for each of at least one designated time periods, obtaining real power usage data and at least one set of real tonnage derivation data; (b) obtaining other chiller information, including design rating information for each of the other chillers, the design rating information including the design rated power requirement; (c) deriving the power requirement difference to operate the first chiller compared to at least one of the other chillers; and (d) differentiating the future use of the first chiller with respect to the hypothetical future use of the at least one other chiller, based on the power requirement difference.

My invention also includes a method for analyzing the performance of an operating chiller, the method comprising the steps of: (a) for the operating chiller and for each of at least one designated time periods, obtaining real power usage data and at least one set of real tonnage derivation data; (b) obtaining design rating information for the operating chiller, the design rating information including the design rated power requirement; (c) for the operating chiller, deriving a representative evaporator tonnage for each designated time period, from the real tonnage derivation data for such designated time period; (d) for the operating chiller, deriving the actual power requirement from the representative evaporator tonnage and the real power usage data; and (e) differentiating the actual power requirement for the operating chiller with respect to the design rated power requirement for such chiller. This method also comprises the step of communicating the results of the power requirement differentiation, including, if the actual power requirement is unsatisfactory when compared to the design rated power requirement, communicating an indication that an unsatisfactory condition exists; and also communicating suggestions as to potential causes of and solutions to the unsatisfactory condition. The satisfactory determination can be based on operator selected tolerance ranges.

My invention also includes a method for economically analyzing the performance of an operating first chiller with respect to the hypothetical design rated performance of at least two other chillers, the method comprising the steps of: (a) for the first chiller and for each of at least one designated time periods, obtaining at least one set of real tonnage derivation data, real power usage data, and cost per unit of power data; (b) obtaining other chiller information, including design rating information for at least two of the other chillers, the design rating information for each of the at least two chillers including the design rated power requirement; (c) deriving the power cost difference to operate the first chiller compared to the operation of at least one sequenced combination of at least two of the other chillers; and (d) economically differentiating the future use of the first chiller with respect to the hypothetical future use of the at least one sequenced combination of the at least two other chillers. This method also comprises the step of inputting the selection of the at least two other chillers in the combination, including the order in which the at least two other chillers in the selected combination will be utilized in operation.

My invention includes a computer readable medium containing program instructions for execution on a computer system, which when executed by a computer, cause the computer system to perform all the above method steps.

My invention also includes means for performing all the above method steps.

In the description reference is made to the accompanying drawings, which form a part hereof, and in which is shown by way of illustration, specific embodiments in which the invention may be practiced. These embodiments will be described in sufficient detail to enable those skilled in the art to practice the invention, and it is to be understood that other embodiments may be utilized and that changes may be made without departing from the scope of the invention. The following detailed description is, therefore, not to be taken in a limiting sense, and the scope of the present invention is best defined by the appended claims.

BRIEF DESCRIPTION OF THE DRAWING FIGURES

Various other objects, features and attendant advantages of the present invention will become more fully appreciated as the same becomes better understood when considered in conjunction with the accompanying drawings.

FIG. 5 is an representation of the system's textual display of the "fault" for excessive power requirement, its possible causes, and its potential solutions.

FIG. 6 is an representation of the system's textual display of the "fault" for low evaporator fluid temperature differential, its possible causes, and its potential solutions.

FIG. 7 is an representation of the system's textual display of the "fault" for low condenser fluid temperature differential, its possible causes, and its potential solutions.

FIG. 8 is an representation of the system's textual display of the "fault" for low evaporator water flow rate, its possible causes, and its potential solutions.

FIG. 9 is an representation of the system's textual display of the "fault" for condenser water flow rate, its possible causes, and its potential solutions.

DESCRIPTION OF THE REFERENCED NUMERALS

Figure 1:
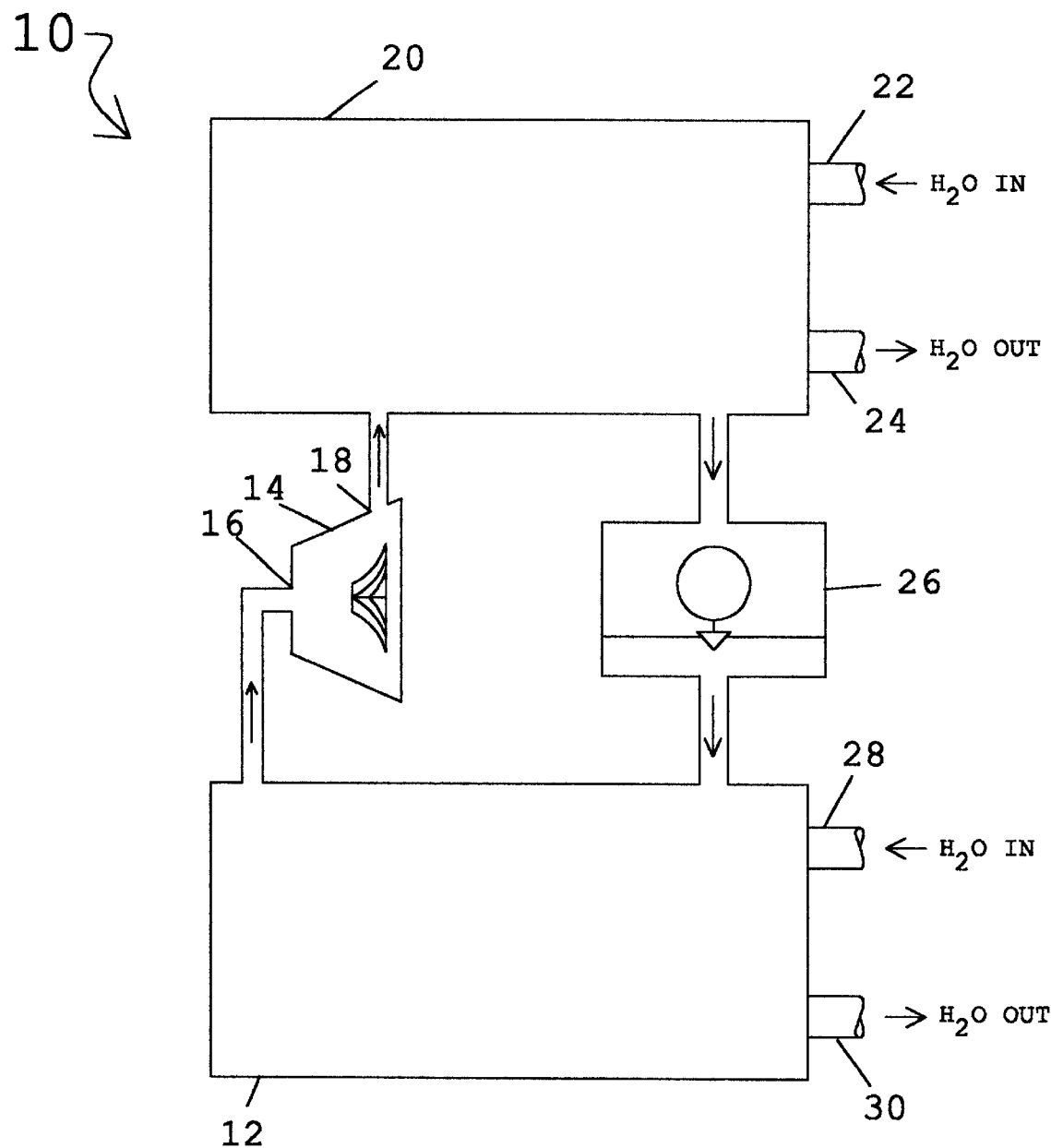
FIG. 1 is a simplified diagram of a typical water-chilling package.

Turning now descriptively to the drawings, in which similar reference characters denote similar elements throughout the several views, the Figures illustrate the System for Analyzing and Comparing Current and Prospective Refrigeration Packages of the present invention. With regard to the reference numerals used, the following numbering is used throughout the various drawing figures.

10 water-chilling package
12 evaporator
14 compressor/motor
16 compressor suction
18 compressor discharge
20 condenser
22 condenser fluid inlet
24 condenser outlet
26 float valve
28 evaporator fluid inlet
30 evaporator fluid outlet
100 computer system
102 computer input—database RTDD, RPUD, specific heat
104 computer input—real-time RTDD, RPUD
106 computer input—database additional chiller information
108 computer input—real-time additional chiller information
110 computer input—programmed specific heat
112 computer input—user input specific heat
114 computer input—database cost per unit of power data
116 computer input—user input cost per unit of power data
130 computer input—database design rating information for at least one other chiller
132 computer input—user input design rating information for at least one other chiller
134 computer input—cost to replace with one of the other chillers
134 computer input—
136 computer input—unsatisfactory condition cause/solution information
138 computer input—user input operator interest rate
140 computer input—user input future cost analysis period
142 computer input—user selected combination of at least two other chillers for joint analysis
144 computer input—selection of at least one other chiller for comparison

DETAILED DESCRIPTION OF THE PREFERRED EMBODIMENT

A diagram of a typical water-chilling package 10 is shown in FIG. 1. Typically included is an evaporator 12, which discharges vaporized refrigerant to a centrifugal compressor/ motor 14 through compressor suction 16. The compressed vapor is discharged through compressor discharge 18 to the condenser 20. In the condenser 20 heat is exchanged with condenser fluid which enters the condenser 20 through condenser fluid inlet 22, and exits through a condenser outlet 24. The condenser fluid is cooled in a cooling tower (not shown). The liquid refrigerant is discharged from the condenser 20 to float valve 26, from which it is discharged into the evaporator 12. In the evaporator 12, heat is taken from the evaporator fluid entering through the evaporator fluid inlet 28, and exiting through the evaporator fluid outlet 30.

Figure 2:
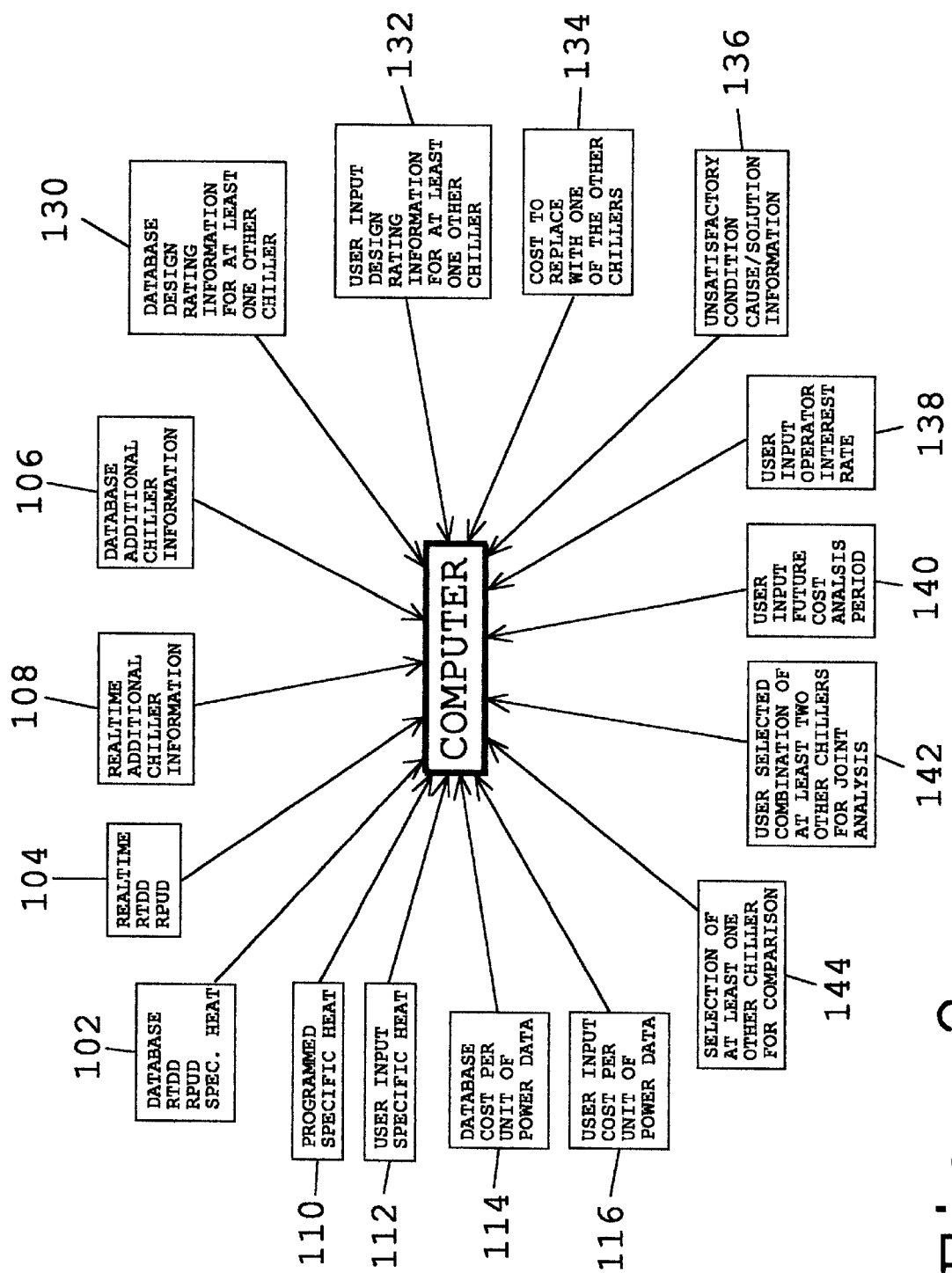
FIG. 2 is a greatly simplified block diagram showing various system inputs.

In the various embodiments of my system, a computer 100 obtains data, both by the direct measurement of such data, from current or past operator data input, from programmed constants, and from stored data. FIG. 2 depicts the various data and information inputs received by the computer 100 as needed to perform the various derivations discussed herein.

As indicated in FIG. 2, data may be received from a data base 102 containing historical real tonnage derivation data, including the temperature of the water leaving ($T_{el}$) the evaporator 12, the temperature of the water entering ($T_{ee}$) the evaporator 12, the mass flow rate. of the water ($m_{we}$) from the evaporator 12, and the specific heat (c) of the evaporator water. Historical real power usage data (kw/h) is also present in the database 102. In some applications, the same data is obtained in real time 104 from direct measurement.

Another data source 106 includes additional chiller 10 performance information, including, but not limited to, the mass flow rate of the water ($m_{wc}$) from the condenser 20, the temperature of the condenser water entering ($T_e$) the condenser 12, the temperature of the condenser water leaving ($T_{cl}$) the condenser 12, the temperature of the evaporator refrigerant ($T_{er}$), the temperature of the condenser refrigerant ($T_{cr}$), the pressure of the evaporator refrigerant ($P_{er}$), the pressure of the condenser refrigerant ($P_{cr}$), the temperature of the supply oil ($T_{soc}$) to the compressor 14, and the amount of chiller vibration (CV).

Similar additional chiller performance information is also obtained in real time 108.

The specific heat of the evaporator water can be obtained as a program constant 110. It can also be a user input 112.

Cost per unit of power data is provided from a database 114 or from user input 116.

A database 130 provides design rating information for at least one other chiller, including design rated power requirements (DRPR), design rated maximum evaporator tonnage (DRMET), the cost to replace the operating first chiller with at least one of the other chillers (RCOC), and additional design rating information for the other chillers. Similar design rating information for such other chillers can also be provided from user input 132.

The cost to replace the operating first chiller with at least one of the other chillers is obtainable 134

When unsatisfactory conditions, i.e. faults, are noted, the system obtains fault cause and solution information 136.

In some embodiments, an interest rate of interest to the operator can be input 138. In a similar fashion, the user can select the appropriate number of years in the future cost analysis period (FCAP) 140.

The user can also select a sequenced combination 142 of two other chillers, for a comparison of the operating first chiller's performance to the combined performance of such other two chillers. Similarly, the user inputs which of the other chillers is to be compared to the operating first chiller 144.

Figure 3:
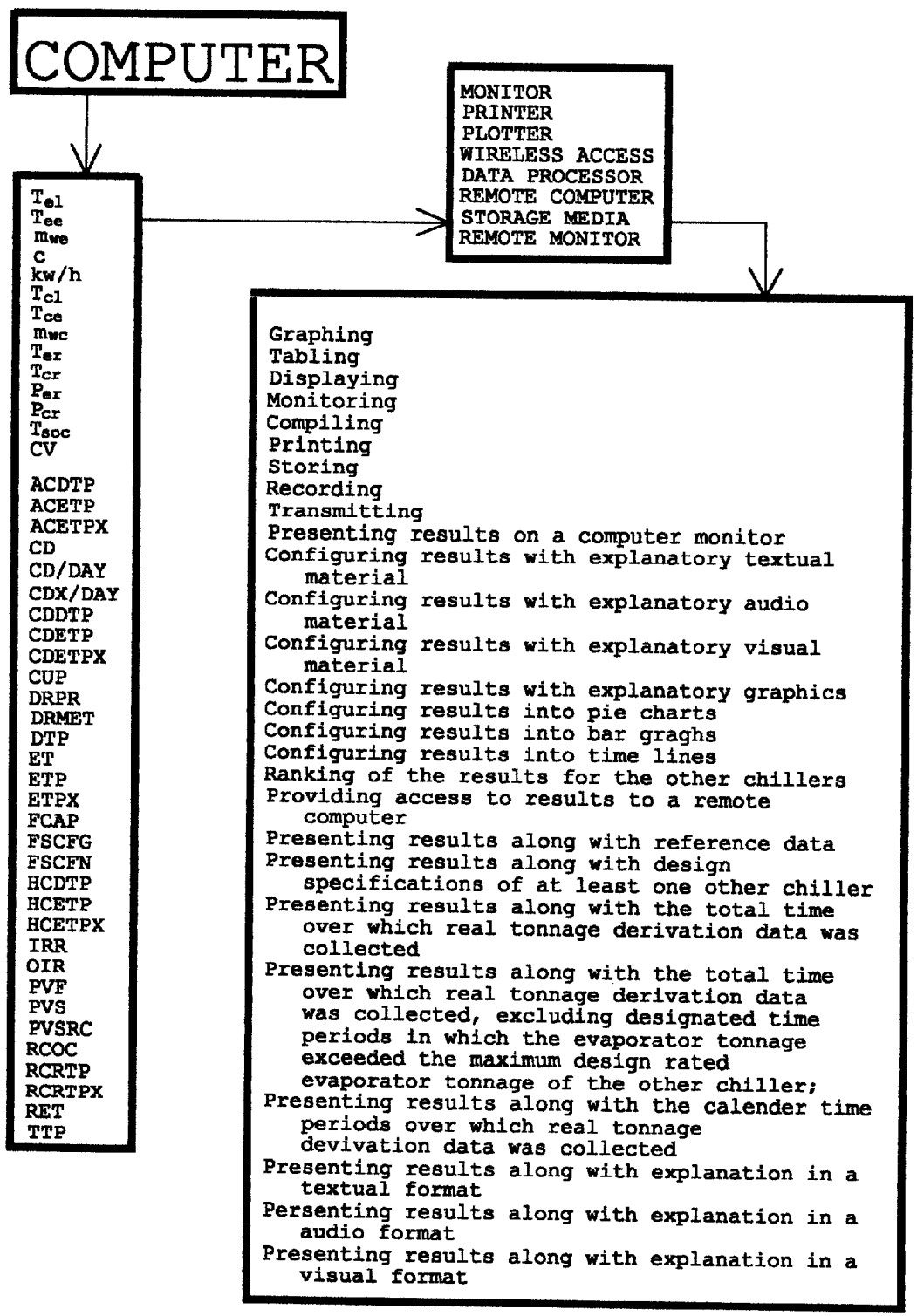
FIG. 3 is a greatly simplified block diagram of a computer system containing a non-exclusive depiction of several available analytical output and output modes and formats with respect to my invention.
Figure 4:
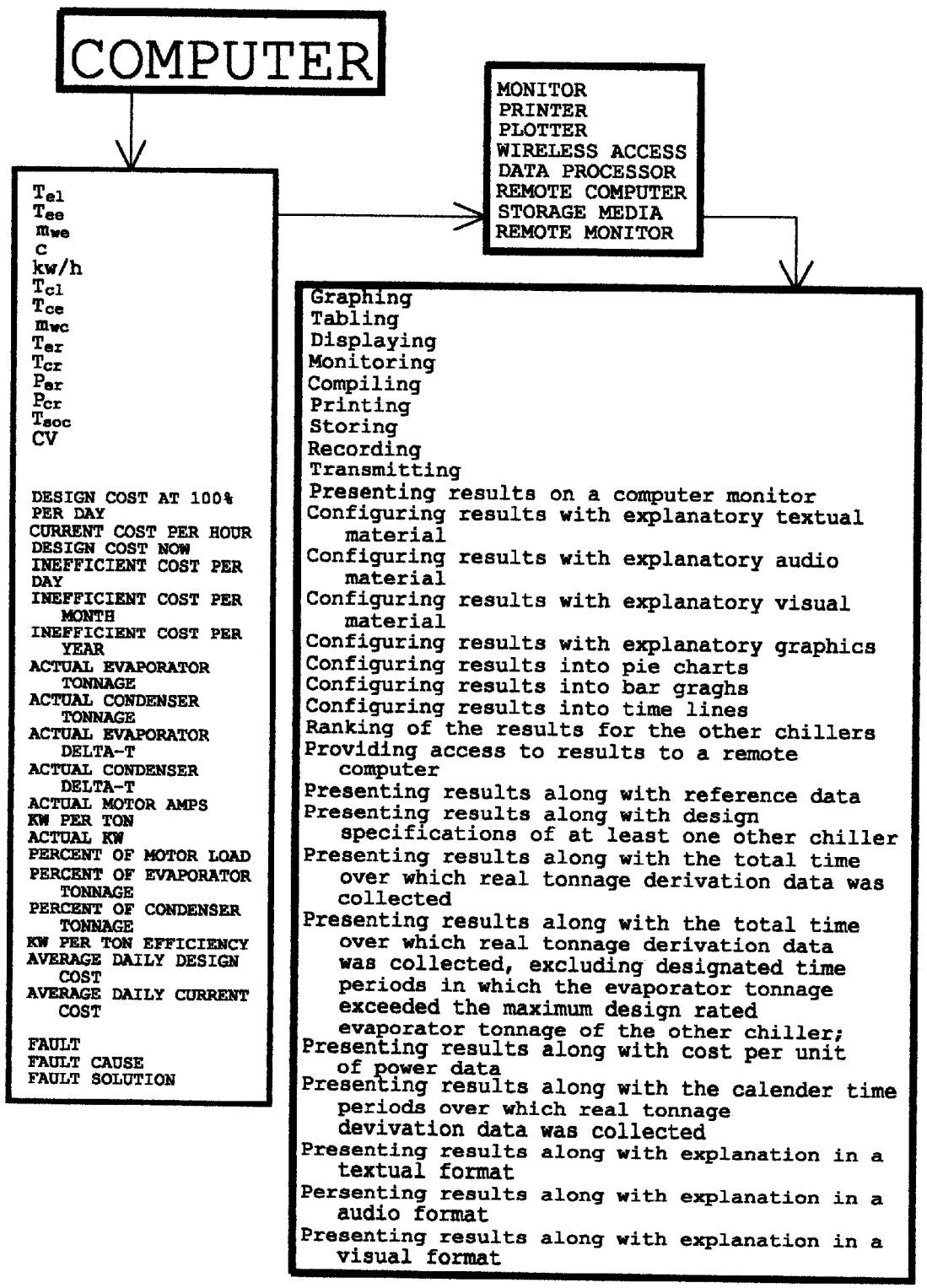
FIG. 4 is a greatly simplified block diagram of a computer system containing a non-exclusive depiction of several available analytical output and output modes and formats with respect to my invention.

FIGS. 3–4 illustrate the variety of analytical outputs and output modes and formats that can be utilized by my system.

In the preferred system application a computer 100 obtains a set of real tonnage derivation data and the real power usage data every two seconds during the operation of the water-chiller package. The evaporator tonnage (ET) is calculated for each such set of real tonnage derivation data and averaged several times over gradually increasing increments, eventually resulting in the determination of a representative evaporator tonnage (RET) for the designated time period (DTP) of one hour. Incremental averages are recorded, as well. From the real power usage data and the known cost per unit of power, an actual cost of power for the designated time period (ACDTP) can be determined. This process is repeated for a total test period (TTP) measured in days. Times during which the chiller was down and out of operation, are excluded leaving an extended time period (ETP) that is used for analysis. The extended time period will typically include several hundred or even thousand designated time periods.

Having excluded the down time days, the actual cost of power over the extended period of time (ACETP) can be represented by the equation:

$$ACETP = \Sigma_{j=1}^{P} ACDTP_j$$

where P is the number of designated time periods in the extended time period.

The system simultaneously calculates the hypothetical cost of power over each designated time period (HCDTP) for at least one of the other chillers, using the same cost per unit of power (CUP), the representative evaporator tonnage calculated above, and the design rated power requirement (DRPR) for the other chiller. The hypothetical cost of power over the extended period of time (HCETP) can be represented by the equation:

$$HCETP = \Sigma_{j=1}^{P} HCDTP_j$$

where P again equals the number of designated time periods in the extended time period.

In some instances the design rated power requirement is provided by the manufacturer as a function of the evaporator tonnage. If such is the case, it is an advantage of my system that the design rated power requirement of the other chiller can be calculated for each designated time period using the representative evaporator tonnage for such designated time period. In this manner, the correct design rated power requirement is utilized for each designated time period.

When the hypothetical cost over the extended time period and the actual cost over the extended time period are known, the total power cost difference over the extended time period (CDETP), can be determined by taking the difference, as shown in the following equation:

$$CDETP = ACETP - HCETP$$

This cost difference can be restated as a cost difference per unit of time, e.g. days (CD/DAY). In this example application, the most relevant time consideration is the total time period during which data was collected. Accordingly, the cost difference per day can be determined from the equation:

$$CD/DAY = CDETP/TTP$$

Using this cost difference per day as a basis, the system provides an economic differentiation between continuing with the operating first chiller or replacing it with the other chiller. In one application of the system, replacement cost recovery time period (RCRTP) is determinable from the foregoing cost difference per day and the known replacement cost for the other chiller (RCOC). The following equation determines the replacement cost recovery time period in years:

$$RCRTP = RCOC \div (CD/DAY \times 365)$$

Since replacement cost for the other chiller is an operator input, the operator can adjust this amount to includes various combinations of the purchase price, the price of collateral equipment associated with the installation, lost business income during installation, manufacturer discounts, and any other factors specific to the operator's business that might need to be considered.

In another application, a future cost analysis period (FCAP) is selected by the user, with the future cost analysis period being a number of years. The cost difference per day is used with the future cost analysis period to derive the future savings cash flows generated by the replacement of the operating first chiller with the other chiller. The gross future savings cash flow (FSCFG), i.e. without considering the replacement cost for the other chiller, is determinable from the equation:

$$FSCFG = CD/DAY \times 365 \times FCAP$$

Similarly, the net future savings cash flow (FSCFN), i.e. considering the replacement cost for the other chiller, is determinable from the equation:

$$FSCFN = (CD/DAY \times 365 \times FCAP) - RCOC$$

The interest rate of interest to the operator (OIR) can be used to determine the present value factors (PVF) for each year of the future cost analysis period. The cost difference per day is then utilized, along with such factors, to determine the present value of the future savings. When the replacement cost for the other chiller is ignored the net present value of the future savings (PVS) can be determined from the following equation:

$$PVS = \Sigma_{k=1}^{FCAP}(CD/DAY \times 365 \times PVF_k)$$

When replacement cost for the other chiller is considered as having been spent at the beginning of the future cost analysis period, the net present value of the future savings (PVSRC) can be determined from the following equation:

$$PVSRC = \Sigma_{k=1}^{FCAP}(CD/DAY \times 365 \times PVF_k) - RCOC$$

The future cost savings can be treated as a return on an investment equal to the replacement cost for the other chiller. An internal rate of return (IRR) can be determined for the prospective investment using typical accounting techniques, wherein the present value of the future savings is set equal to the present value of the investment.

The cost difference per day, replacement cost recovery time period, gross future savings cash flow, net future savings cash flow, net present value, net present value considering replacement cost, and internal rate of return will be different for different chillers, as each undergoes the foregoing analysis. Since these are items of great economic interest to the operator, it is an advantage of my system, that all other chillers, for which design rating information and replacement costs are available, can be analyzed as a group. After such an analysis, the other chillers are ranked according to the selected economic item, for example, in order of descending replacement cost recovery time period.

It is an advantage of my system that, in determining the cost difference per day, the operator can choose any number of days by which to divide the cost difference over the extended time period. Based on the operator's familiarity with historical downtimes, and other factors, the operator may choose to use a number of days other than the number of days in the total test period.

It will sometimes occur that the other chiller being analyzed will have a manufacturer's design rated maximum evaporator tonnage (DRMET) which is less than some of the representative evaporator tonnages recorded during the extended time period. It is a further advantage of my system that as each representative evaporator tonnage is determined, the representative evaporator tonnage is compared to the design rated maximum evaporator tonnage for the other chiller. In a particular designated time period, if the representative evaporator tonnage exceeds the design rated maximum evaporator tonnage by an operator determined amount, from zero to a user inputted percent of the design rated maximum evaporator tonnage, then the designated time period, and the cost difference attributable to such designated time period, are excluded from the extended time period and the corresponding cost difference over the extended time period.

In such a case, the actual power costs for the designated time period (ACDTP) is equal to zero for the excluded designated time periods, and the adjusted actual power costs over the extended period of time (ACETPX) is determinable from the sum of the remaining actual cost differences.

Similarly, the hypothetical cost difference for the excluded designated time periods are equal to zero and the adjusted hypothetical cost over the extended time period (HCEPTX) is determinable from the sum of the remaining hypothetical cost differences.

The adjusted power cost difference, reflecting the adjusted extended time period (CDETPX) can then be determined from the equation:

$$CDETPX = ACETPX - HCETPX$$

As before it is converted to an adjusted power cost difference per day (CDX/DAY) by the equation:

$$CDX/DAY = CDETPX/TTP$$

An adjusted replacement cost recovery time period can also be determined based on the adjusted power cost difference per day. It is an advantage of my system that the operator can choose the number of days to include in each of the "recovery years," the operator being able to choose to apply the adjusted power cost difference per day for every day in an ordinary year, or to limit such days to something less than 365. Such a limitation might be applicable when an operator wants to consider that the replacement chiller's lower maximum evaporator tonnage will have to be made up from another chiller, having its own power cost. Assuming, that an operator chose to limit the number of days in the "recovery year" to a lower number of days reflecting the ratio of the adjusted extended period of time to the unadjusted period, the following equation would determine the adjusted replacement cost recovery time period (RCRTPX):

$$RCRTPX = RCOC \div (CDX/DAY \times ETPX \div 24 \times 365 \div TTP)$$

where ETPX is the adjusted extended time period.

As part of the full utilization of my system, the design rating information for one of the other chillers is the design rating information for the operating first chiller. Deficits between design rated performance and actual performance are derived and economically analyzed.

In other embodiments of my system, the power requirement difference between the operating first chiller and the other chiller is determined for each designated time period. From the power requirement difference a single power cost difference is determined for each designated time period (CDDTP). When done in this order, the power cost difference over the extended period of time (CDETP) is determined from the equation:

$$CDETP = \sum_{j=1}^{P} CDDTP_j$$

where P is the number of designated time periods in the extended time period.

Another analytical variation is in an additional embodiment, wherein the total power requirement for the operating first chiller is determined for the entire extended time period prior to multiplying by the cost per unit of power to derive the actual cost over the extended time period.

FIG. 3 is a greatly simplified block diagram of the computer system, containing a non-exclusive depiction of several available analytical output and output modes and formats with respect to the above-described features, especially with regard to the economic differentiation of the operating first chiller and the one or more chillers to which it is being compared. For example, a historical record of the representative tonnage data (RET) and real power usage data (RPUD) can be plotted against time, displayed on the screen, printed in graph form, printed in table form, stored for a future analysis on my system, or accessed by a remote computer using ordinary telephone lines, or handheld wireless remote access devices. Upon review of the present disclosure, those skilled in the art of presenting economic forecasts involving future cash flows, investments and the like will note the availability of many presentation formats and media which can be utilized for the purpose of communicating the results of my system's analyses, all in accordance with the present invention, and as determined by the intended end use for the overall device, as will occur to those of skill in the art upon review of the present disclosure.

In additional embodiments of my system, the computer has the ability to obtain and analyze real time real tonnage derivation data and real power usage data 104, as well as, the real time additional chiller information 108. My system is advantageous in that real time observation of such data allows many specific unsatisfactory performance conditions to be ascertained and brought to the operator's attention, along with explanatory information as to the possible causes and solutions of such conditions.

FIG. 4 is a greatly simplified block diagram of the computer system, containing a non-exclusive depiction of several avail able analytical output and output modes and formats with respect to the foregoing real time analysis.

For example, the operator is continually informed by the monitor display, as to how much power the operating chiller is using (ACTUAL KW), its actual power requirement (KW PER TON), and its power usage efficiency (KW PER TON EFFICIENCY) compared to its design power requirement. From such information, a "snapshot" economic forecast is continuously displayed such that the operator can understand the future costs of any immediate power requirement inefficiency, on a daily basis (INEFFICIENT COST PER DAY), a monthly basis (INEFFICIENT COST PER DAY), or a yearly basis (INEFFICIENT COST PER DAY). Related to this information is the cost of power assuming the operating first chiller used only its design rated power requirement for the day (DESIGN COST AT 100% PER DAY). Particular performance aspects can be individually displayed in real time, as well, such as the immediate evaporator tonnage (ACTUAL EVAPORATOR TONNAGE), immediate condenser tonnage (ACTUAL CONDENSER TONNAGE), immediate evaporator fluid temperature differential (ACTUAL EVAPORATOR DELTA-T), immediate condenser fluid temperature differential (ACTUAL CONDENSER DELTA-T), a comparison of the actual motor load to the maximum rated motor load (PERCENT OF MOTOR LOAD), a comparison of actual evaporator tonnage to the maximum design rated evaporator tonnage (PERCENT OF EVAPORATOR TONNAGE),), and a comparison of actual condenser tonnage to the maximum design rated condenser tonnage (PERCENT OF CONDENSER TONNAGE).

With further respect to the real time benefits of the system, FIG. 5 illustrates the content of a representative computer monitor display portion addressing the "fault" arising when the actual power requirements of the chiller exceed the design rated power requirements for such chiller. Both potential causes and solutions are provided. Similarly, FIGS. 6–9, illustrate the contents of a similar monitor displays, addressing an unsatisfactory conditions such as low evaporator fluid temperature differential, low condenser fluid temperature differential, low evaporator fluid flow rate, and low condenser fluid flow rate, respectively. It is contemplated that similar messages will be provided for other unsatisfactory performance conditions, including chiller vibration, low evaporator fluid temperature leaving the evaporator, and high supply oil to the compressor temperature, among others.

With respect to all real time performance monitoring for unsatisfactory conditions, the operator can input acceptable tolerance ranges or rely on the manufacture design rated levels of performance.

In other embodiments, the system performs one or more quantitative analyses of the power requirement differences between the future use of the operating first chiller compared to at least one other chiller, without reference to costs.

FIGS. 3–4 depict the inclusion of various computer system related components related to display, printing, monitoring, storing, remotely accessing, and data processing, all or some of which are utilized to communicate the analytical results of the system shown on such figures, in one or more of the communication modes and formals shown. Storage media commonly take the form of one or more memory devices, (e.g. random-access memory) in combination with, e.g., one or more mass storage devices, such as hard-disks, optical disks, magnetic tapes, and flash memory devices, among others. One or more such storage media are used in the presently disclosed embodiments of my invention.

The computer 100 will have a processor, typically a central processing unit (CPU), and display processing hardware coupled to the monitor, other terminals, printers, graph plotters, and the like. Other communication processing hardware will be present including modems and the like for remotely accessing the computer.

In accordance with the principles of the present invention, the CPU functions under the control of the programmed software application to process the various data and information inputs, described in part, on FIG. 2. The resultant output of this processing may then be displayed or communicated as described above, and as depicted in FIGS. 3–9.

The above-described analytical results and features, may be implemented by programming a suitable general-purpose computer having appropriate hardware. The programming may be accomplished through the use of a program storage device readable by the computer and encoding a program of instructions executable by the computer for performing the analyses and functions described above. The program storage device may take the form of, e.g. one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code.

It will be understood that each of the elements described above, or two or more together may also find a useful application in other types of methods differing from the type described above, in particular with respect to other types of refrigeration packages, and chillers using on-water evaporator fluids, e.g. glycol.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method for economically analyzing the performance of an operating first chiller with respect to the hypothetical design rated performance of at least one other chiller, the method comprising the steps of:
   (a) for the first chiller and for each of at least one designated time periods, obtaining at least one set of real tonnage derivation data, real power usage data, and cost per unit of power data;
   (b) obtaining other chiller information, including design rating information for each of the other chillers, the design rating information including the design rated power requirement;
   (c) deriving the power cost difference to operate the first chiller compared to at least one of the other chillers; and
   (d) economically differentiating the future use of the first chiller with respect to the hypothetical future use of the at least one other chiller.

2. The method of claim 1, wherein, if the design rated power requirement for the other chiller is a function of the evaporator tonnage, then the step of deriving the power cost difference further comprises the step of deriving the appropriate design rated power requirement for each designated time period based on the evaporator tonnage for such designated time period.

3. The method of claim 1, wherein:
   (a) the step of obtaining other chiller information further comprises obtaining the design rated maximum evaporator tonnage for the at least one other chiller;
   (b) the step of obtaining real tonnage derivation data and real power usage data further comprises obtaining such data over an extended time period, the extended time period including at least two designated time periods; and
   (c) the step of deriving the power cost difference further comprises (1) determining a representative evaporator tonnage for each designated time period from the real evaporator tonnage equation data, (2) comparing each such representative evaporator tonnage to the design rated maximum evaporator tonnage for the at least one other chiller, and (3) excluding from consideration all designated time periods in which the representative evaporator tonnage exceeded such design rated maximum evaporator tonnage for the at least one other chiller.

4. The method of claim 1, wherein:
   (a) the step of obtaining other chiller information further comprises obtaining the design rated maximum evaporator tonnage for the at least one other chiller;
   (b) the step of obtaining real tonnage derivation data and real power usage data further comprises obtaining such data over an extended time period, the extended time period including at least two designated time periods; and
   (c) the step of deriving the power cost difference further comprises (1) determining a representative evaporator tonnage for each designated time period from the real evaporator tonnage equation data, (2) comparing each such representative evaporator tonnage to the design rated maximum evaporator tonnage for the at least one other chiller, and (3) excluding from consideration all designated time periods in which the representative evaporator tonnage substantially exceeded such design rated maximum evaporator tonnage for the at least one other chiller.

5. The method of claim 1, wherein the step of deriving the power cost difference further comprises the steps of:
   (a)(1) deriving a representative cost to operate the first chiller for each designated time period, and (2) summing such costs over an extended time period, the extended time period including two or more designated time periods;
   (b)(1) deriving the hypothetical power cost of the at least one other chiller for each designated time period in the extended time period, and (2) summing such costs over the extended time period; and
   (c) determining the difference between the summed actual costs and the summed hypothetical costs.

6. The method of claim 5, wherein:
   (a) the step of obtaining other chiller information, further comprises the step of obtaining the design rated maximum evaporator tonnage for the at least one other chiller;
   (b) the step of deriving a representative cost further comprises the step of deriving a representative evaporator tonnage for each designated time period;
   (c) the step of summing the representative power cost used by the first chiller for each designated time period over an extended time period, further comprises the steps of (1) comparing the representative evaporator tonnage to such design rated maximum evaporator tonnage, and (2) excluding from the extended period of time all designated time periods where the representative evaporator tonnage exceeds the design rated maximum evaporator tonnage, such that the extended time period only includes designated time periods for which the representative evaporator tonnage is less than or equal to the design rated maximum evaporator tonnage.

7. The method of claim 6, wherein the economically differentiating step is selected from the group consisting of:
   (a) determining the time at which the power cost difference equals the cost to replace the first chiller with the at least one other chiller;
   (b) determining the power cost differences between the first chiller and each of at least two of the other chillers;
   (c) determining, from the power cost differences between the first chiller and each of at least two of the other chillers, which of the other chillers has the lowest hypothetical operating cost;
   (d) determining the rate of return on an investment equal to the cost of replacing the first chiller with the at least one other chiller, the income on the investment being equal to the actual and hypothetical power cost difference over a future period of time;
   (e)(1) determining the power cost differences between the first chiller and each of at least two of the other chillers, and (2) determining the rates of return for at least two investments wherein each investment equals the cost of replacing the first chiller with one of the at least two other chillers, the income on each such investment being equal to the power cost difference derived for such chiller over a future period of time. and (2) ranking the rates of return so determined;
   (f)(1) determining the power cost differences between the first chiller and each of at least two of the other chillers, (2) determining the rates of return for at least two investments wherein each investment equals the cost of replacing the first chiller with one of the at least two other chillers, the income on each such investment being equal to the power cost difference derived for such chiller over a future period of time, and (3) ranking the rates of return so determined;
   (g) determining cost savings over future periods of time, the cost savings being generated by the power cost difference between the first chiller and the at least one other chiller;
   (h) determining the net present value of power cost savings over future periods of time, the cost savings being generated by the power cost difference between the first chiller and the at least one other chiller; and
   (i) determining the net present value of power cost savings over future periods of time, the cost savings being generated by the power cost difference between the first chiller and the at least one other chiller, the power cost savings being reduced by the cost of replacing the first chiller with such chiller.

8. The method of claim 7, wherein at least two of the group are selected.

9. The method of claim 6, wherein the economically differentiating step further comprises the steps of:
   (a) determining the power cost differences between the first chiller and each of at least two of the other chillers; and
   (b) ranking the at least two other chillers in order of the power cost difference.

10. The method of claim 6, wherein the economically differentiating step further comprises the steps of:
    (a) determining the power cost differences between the first chiller and each of at least two other chillers; and
    (b) ranking the at least two other chillers in order of the amount of time each such chiller's power cost difference would equal the cost to replace the first chiller with such chiller.

11. The method of claim 1, wherein the economically differentiating step further comprises converting the power cost difference into a power cost difference per unit of time.

12. The method of claim 11, wherein the unit of time used in the converting step is selected from the group consisting of hours, days, weeks, months, years, the designated time period, and integer multiples of the designated time period.

13. The method of claim 1, wherein the step of deriving the power cost difference further comprises the step of determining a representative cost of power and a representative evaporator tonnage for each designated time period.

14. The method of claim 13, wherein the number of sets of real tonnage derivation data for each designated time period is two or more, the representative evaporator tonnage is the average of the derived evaporator tonnages for each such set, the real power usage data includes a datum for each set of real tonnage derivation data, each datum coinciding with one set of real tonnage derivation data, and the representative cost for a designated time period is based on the average of all real power usage data from the designated time period.

15. The method of claim 1, wherein the economically differentiating step is selected from the group consisting of:
    (a) determining the time at which the power cost difference equals the cost to replace the first chiller with the at least one other chiller;
    (b) determining the power cost differences between the first chiller and each of at least two of the other chillers;
    (c) determining, from the power cost differences between the first chiller and each of at least two of the other chillers, which of the other chillers has the lowest hypothetical operating cost;
    (d) determining the rate of return on an investment equal to the cost of replacing the first chiller with the at least one other chiller, the income on the investment being equal to the actual and hypothetical power cost difference over a future period of time;
    (e)(1) determining the power cost differences between the first chiller and each of at least two of the other chillers, and (2) determining the rates of return for at least two investments wherein each investment equals the cost of replacing the first chiller with one of the at least two other chillers, the income on each such investment being equal to the power cost difference derived for such chiller over a future period of time. and (2) ranking the rates of return so determined;
    (f)(1) determining the power cost differences between the first chiller and each of at least two of the other chillers, (2) determining the rates of return for at least two investments wherein each investment equals the cost of replacing the first chiller with one of the at least two other chillers, the income on each such investment being equal to the power cost difference derived for such chiller over a future period of time. and (3) ranking the rates of return so determined;
    (g) determining cost savings over future periods of time, the cost savings being generated by the power cost difference between the first chiller and the at least one other chiller;
    (h) determining the net present value of power cost savings over future periods of time, the cost savings being generated by the power cost difference between the first chiller and the at least one other chiller; and (i) determining the net present value of power cost savings over future periods of time, the cost savings being generated by the power cost difference between the first chiller and the at least one other chiller, the power cost savings being reduced by the cost of replacing the first chiller with such chiller.

16. The method of claim 15, wherein at least two of the group are selected.

17. The method of claim 1, wherein the economically differentiating step further comprises the steps of:
   (a) determining the power cost differences between the first chiller and each of at least two of the other chillers; and
   (b) ranking the at least two other chillers in order of the power cost difference.

18. The method of claim 1, wherein the economically differentiating step further comprises the steps of:
   (a) determining the power cost differences between the first chiller and each of at least two other chillers; and
   (b) ranking the at least two other chillers in order of the amount of time each such chiller's power cost difference would equal the cost to replace the first chiller with such chiller.

19. The method of claim 1, further comprising the step of communicating the results of the economic differentiation.

20. The method of claim 19, wherein the communicating step is selected from the group consisting of:
   (a) graphing one or more of the results;
   (b) tabling one or more of the results;
   (c) displaying one or more of the results;
   (d) monitoring one or more of the results;
   (e) compiling one or more of the results;
   (f) printing one or more of the results;
   (g) storing one or more of the results;
   (h) recording one or more of the results;
   (i) transmitting one or more of the results;
   (j) presenting one or more of the results on a computer monitor;
   (k) configuring one or more results with explanatory textual material;
   (l) configuring one or more results with explanatory audio material;
   (m) configuring one or more results with explanatory visual material;
   (n) configuring one or more results with explanatory graphics;
   (o) configuring one or more results into pie charts;
   (p) configuring one or more results into bar graphs;
   (q) configuring one or more results into time lines;
   (r) ranking one or more of the results for each of the other chillers;
   (s) providing access to one or more results to a remote computer; and
   (t) presenting one or more results along with reference data.

21. The method of claim 20, wherein at least two of the group are selected.

22. The method of claim 19, wherein the communicating step is selected from from the group consisting of:
   (a) presenting one or more results along with design specifications of the at least one other chiller;
   (b) presenting one or more results along with the total time over which real tonnage derivation data was collected;
   (c) presenting one or more results along with the total time over which real tonnage derivation data was collected, excluding designated time periods in which the evaporator tonnage exceeded the maximum design rated evaporator tonnage of the other chiller;
   (d) presenting one or more results along with the cost per unit of power data;
   (e) presenting one or more results along with the calendar time periods over which real tonnage derivation data was collected;
   (f) presenting one or more results along with explanation in a texual format;
   (g) presenting one or more results along with explanation in an audio format; and
   (h) presenting one or more results along with explanation in a visual format.

23. The method of claim 22, wherein at least two of the group are selected.

24. The method of claim 1, wherein the number of other chillers is at least two.

25. The method of claim 1, wherein at least one of the other chillers is design rated such that it is equivalent to the design rated performance of the first chiller with respect to power requirements.

26. The method of claim 1, wherein the real tonnage derivation data includes data for the evaporator fluid flow rate, the temperature of the evaporator fluid entering the evaporator, the temperature of the evaporator fluid leaving the evaporator, and the specific heat of the evaporator fluid.

27. The method of claim 26, wherein the evaporator fluid flow rate, the temperature of the evaporator fluid entering the evaporator, and the temperature of the evaporator fluid leaving the evaporator, are measured, and the specific heat of the evaporator fluid is pre-determined.

28. The method of claim 1, wherein the evaporator fluid is water.

29. The method of claim 1, wherein the evaporator fluid is not water.

30. The method of claim 1, wherein at least some of the real tonnage derivation data is stored prior to access.

31. The method of claim 1, wherein the obtaining real power usage data and real tonnage derivation data step further comprises the step of measuring the data during chiller operation.

32. The method of claim 31, wherein the measuring step further comprises the step of storing the data for future access.

33. The method of claim 31, wherein the measuring step further comprises the step of accessing the data for real time derivation and economic differentiation.

34. The method of claim 33, wherein the measuring step further comprises the step of accessing the data for real time communication.

35. The method of claim 31, wherein the measuring step further comprises the step of measuring additional chiller performance data.

36. The method of claim 35, wherein the additional chiller performance data measuring step is selected from the group consisting of:
   (a) measuring the condenser fluid flow rate;
   (b) measuring the temperature of the condenser fluid entering the condenser;
   (c) measuring the temperature of the condenser fluid leaving the condenser;
   (d) measuring the temperature of the evaporator refigerant;

(e) measuring the temperature of the condenser refrigerant;

(f) measuring the temperature of the supply oil to the compressor;

(g) measuring the pressure. of the evaporator refigerant;

(h) measuring the pressure of the condenser refigerant; and (i) measuring chiller vibration.

37. The method of claim 36, wherein at least two of the group are selected.

38. The method of claim 35, wherein the additional chiller performance data measuring step further comprises selectively accessing such data for real time derivation and communication.

39. The method of claim 1, further comprising the step of obtaining selection input by which the at least one other chillers for comparison is selected for economic differentiation.

40. The method of claim 1, wherein the power cost difference deriving step further comprises the steps of:

(a) for the first chiller, deriving a representative evaporator tonnage for each designated time period, from the real tonnage derivation data for such designated time period; and (b) determining the difference in power requirements between the first chiller and at least one of the other chillers for each designated time period, from the representative evaporator tonnage, the real power usage data, and the design rated power requirements for the at least one other chiller.

41. The method of claim 1, wherein the step of deriving the power cost difference further comprises the steps of:

(a) multiplying the cost of power per unit of power times the actual amount of power used over an extended time period, the extended time period including two or more designated time periods;

(b) deriving the hypothetical power cost for the at least one other chiller for each designated time period in the extended time period, and summing such costs over the extended time period; and (c) determining the difference between the actual power cost and the summed hypothetical costs.

42. A method for economically analyzing the performance of an operating first chiller with respect to the hypothetical design rated performance of at least two other chillers, the method comprising the steps of:

(a) for the first chiller and for each of at least one designated time periods, obtaining at least one set of real tonnage derivation data, real power usage data, and cost per unit of power data;

(b) obtaining other chiller information, including design rating information for at least two of the other chillers, the design rating information for each of the at least two chillers including the design rated power requirement;

(c) deriving the power cost difference to operate the first chiller compared to the operation of at least one sequenced combination of at least two of the other chillers; and (d) economically differentiating the future use of the first chiller with respect to the hypothetical future use of the at least one sequenced combination of the at least two other chillers.

43. The method of claim 42, wherein the obtaining other chiller information step further comprises the step of inputing the selection of the at least two other chillers in the combination.

44. The method of claim 43, wherein the inputing the selection step further comprises the step of inputing the order in which the at least two other chillers in the selected combination will be utilized in operation.

45. The method of claim 42, wherein the number of sequenced combinations is at least two.

46. A computer readable medium containing program instructions for execution on a computer system, which when executed by a computer, cause the computer system to perform method steps for economically analyzing the performance of an operating first chiller with respect to the hypothetical design rated performance of at least one other chiller, the method comprising the steps of:

(a) for the first chiller and for each of at least one designated time periods, obtaining at least one set of real tonnage derivation data, real power usage data, and cost per unit of power data;

(b) obtaining other chiller information, including design rating information for each of the other chillers, the design rating information including the design rated power requirement;

(c) deriving the power cost difference to operate the first chiller compared to at least one of the other chillers; and (d) economically differentiating the future use of the first chiller with respect to the hypothetical future use of the at least one other chiller.

47. The computer readable medium of claim 46, wherein, if the design rated power requirement for the other chiller is a function of the evaporator tonnage, then the step of deriving the power cost difference further comprises the step of deriving the appropriate design rated power requirement for each designated time period based on the evaporator tonnage for such designated time period.

48. The computer readable medium of claim 46, wherein:

(a) the step of obtaining other chiller information further comprises obtaining the design rated maximum evaporator tonnage for the at least one other chiller;

(b) the step of obtaining real tonnage derivation data and real power usage data further comprises obtaining such data over an extended time period, the extended time period including at least two designated time periods; and (c) the step of deriving the power cost difference further comprises (1) determining a representative evaporator tonnage for each designated time period from the real evaporator tonnage equation data, (2) comparing each such representative evaporator tonnage to the design rated maximum evaporator tonnage for the at least one other chiller, and (3) excluding from consideration all designated time periods in which the representative evaporator tonnage exceeded such design rated maximum evaporator tonnage for the at least one other chiller.

49. The computer readable medium of claim 46, wherein:

(a) the step of obtaining other chiller information further comprises obtaining the design rated maximum evaporator tonnage for the at least one other chiller;

(b) the step of obtaining real tonnage derivation data and real power usage data further comprises obtaining such data over an extended time period, the extended time period including at least two designated time periods; and (c) the step of deriving the power cost difference further comprises (1) determining a representative evaporator tonnage for each designated time period from the real evaporator tonnage equation data, (2) comparing each such representative evaporator tonnage to the design rated maximum evaporator tonnage for the at least one other chiller, and (3) excluding from consideration all designated time periods in which the representative evaporator tonnage substantially exceeded such design rated maximum evaporator tonnage for the at least one other chiller.

50. The computer readable medium of claim 46, wherein the step of deriving the power cost difference further comprises the steps of:

(a)(1) deriving a representative cost to operate the first chiller for each designated time period, and (2) summing such costs over an extended time period, the extended time period including two or more designated time periods;

(b)(1) deriving the hypothetical power cost of the at least one other chiller for each designated time period in the extended time period, and (2) summing such costs over the extended time period; and (c) determining the difference between the summed actual costs and the summed hypothetical costs.

51. The computer readable medium of claim 50, wherein:

(a) the step of obtaining other chiller information, further comprises the step obtaining the design rated maximum evaporator tonnage for the at least one other chiller;

(b) the step of deriving a representative cost further comprises the steps of deriving a representative evaporator tonnage for each designated time period;

(c) the step of summing the representative power cost used by the first chiller for each designated time period over an extended time period, further comprises the steps of (1) comparing the representative evaporator tonnage to such design rated maximum evaporator tonnage, and (2) excluding from the extended period of time all designated time periods where the representative evaporator tonnage exceeds the design rated maximum evaporator tonnage, such that the extended time period only includes designated time periods for which the representative evaporator tonnage is less than or equal to the design rated maximum evaporator tonnage.

52. The computer readable medium of claim 51, wherein the economically differentiating step is selected from the group consisting of:

(a) determining the time at which the power cost difference equals the cost to replace the first chiller with the at least one other chiller;

(b) determining the power cost differences between the first chiller and each of at least two of the other chillers;

(c) determining, from the power cost differences between the first chiller and each of at least two of the other chillers, which of the other chillers has the lowest hypothetical operating cost;

(d) determining the rate of return on an investment equal to the cost of replacing the first chiller with the at least one other chiller, the income on the investment being equal to the actual and hypothetical power cost difference over a future period of time;

(e)(1) determining the power cost differences between the first chiller and each of at least two of the other chillers, and (2) determining the rates of return for at least two investments wherein each investment equals the cost of replacing the first chiller with one of the at least two other chillers, the income on each such investment being equal to the power cost difference derived for such chiller over a future period of time. and (2) ranking the rates of return so determined;

(f)(1) determining the power cost differences between the first chiller and each of at least two of the other chillers, (2) determining the rates of return for at least two investments wherein each investment equals the cost of replacing the first chiller with one of the at least two other chillers, the income on each such investment being equal to the power cost difference derived for such chiller over a future period of time. and (3) ranking the rates of return so determined;

(g) determining cost savings over future periods of time, the cost savings being generated by the power cost difference between the first chiller and the at least one other chiller;

(h) determining the net present value of power cost savings over future periods of time, the cost savings being generated by the power cost difference between the first chiller and the at least one other chiller; and (i) determining the net present value of power cost savings over future periods of time, the cost savings being generated by the power cost difference between the first chiller and the at least one other chiller, the power cost savings being reduced by the cost of replacing the first chiller with such chiller.

53. The computer readable medium of claim 52, wherein at least two of the group are selected.

54. The computer readable medium of claim 51, wherein the economically differentiating step further comprises the steps of:

(a) determining the power cost differences between the first chiller and each of at least two of the other chillers; and (b) ranking the at least two other chillers in order of the power cost difference.

55. The computer readable medium of claim 51, wherein the economically differentiating step further comprises the steps of:

(a) determining the power cost differences between the first chiller and each of at least two other chillers; and (b) ranking the at least two other chillers in order of the amount of time each such chiller's power cost difference would equal the cost to replace the first chiller with such chiller.

56. The computer readable medium of claim 40, wherein the economically differentiating step further comprises converting the power cost difference into a power cost difference per unit of time.

57. The computer readable medium of claim 56, wherein the unit of time used in the converting step is selected from the group consisting of hours, days, weeks, months, years, the designated time period, and integer multiples of the designated time period.

58. The computer readable medium of claim 46, wherein the step of deriving the power cost difference further comprises the step of determining a representative cost of power and a representative evaporator tonnage for each designated time period.

59. The computer readable medium of claim 58, wherein the number of sets of real tonnage derivation data for each designated time period is two or more, the representative evaporator tonnage is the average of the derived evaporator tonnages for each such set, the real power usage data includes a datum for each set of real tonnage derivation data, each datum coinciding with one set of real tonnage derivation data, and the representative cost for a designated time period is based on the average of all real power usage data from the designated time period.

60. The computer readable medium of claim 46, wherein the economically differentiating step is selected from the group consisting of:
   (a) determining the time at which the power cost difference equals the cost to replace the first chiller with the at least one other chiller;
   (b) determining the power cost differences between the first chiller and each of at least two of the other chillers;
   (c) determining, from the power cost differences between the first chiller and each of at least two of the other chillers, which of the other chillers has the lowest hypothetical operating cost;
   (d) determining the rate of return on an investment equal to the cost of replacing the first chiller with the at least one other chiller, the income on the investment being equal to the actual and hypothetical power cost difference over a future period of time;
   (e)(1) determining the power cost differences between the first chiller and each of at least two of the other chillers, and (2) determining the rates of return for at least two investments wherein each investment equals the cost of replacing the first chiller with one of the at least two other chillers, the income on each such investment being equal to the power cost difference derived for such chiller over a future period of time and (2) ranking the rates of return so determined;
   (f)(1) determining the power cost differences between the first chiller and each of at least two of the other chillers, (2) determining the rates of return for at least two investments wherein each investment equals the cost of replacing the first chiller with one of the at least two other chillers, the income on each such investment being equal to the power cost difference derived for such chiller over a future period of time and (3) ranking the rates of return so determined;
   (g) determining cost savings over future periods of time, the cost savings being generated by the power cost difference between the first chiller and the at least one other chiller;
   (h) determining the net present value of power cost savings over future periods of time, the cost savings being generated by the power cost difference between the first chiller and the at least one other chiller; and
   (i) determining the net present value of power cost savings over future periods of time, the cost savings being generated by the power cost difference between the first chiller and the at least one other chiller, the power cost savings being reduced by the cost of replacing the first chiller with such chiller.

61. The computer readable medium of claim 60, wherein at least two of the group are selected.

62. The computer readable medium of claim 46, wherein the economically differentiating step further comprises the steps of:
   (a) determining the power cost differences between the first chiller and each of at least two of the other chillers; and
   (b) ranking the at least two other chillers in order of the power cost difference.

63. The computer readable medium of claim 46, wherein the economically differentiating step further comprises the steps of:
   (a) determining the power cost differences between the first chiller and each of at least two other chillers; and
   (b) ranking the at least two other chillers in order of the amount of time each such chiller's power cost difference would equal the cost to replace the first chiller with such chiller.

64. The computer readable medium of claim 46, further comprising the step of communicating the results of the economic differentiation.

65. The computer readable medium of claim 64, wherein the communicating step is selected from the group consisting of:
   (a) graphing one or more of the results;
   (b) tabling one or more of the results;
   (c) displaying one or more of the results;
   (d) monitoring one or more of the results;
   (e) compiling one or more of the results;
   (f) printing one or more of the results;
   (g) storing one or more of the results;
   (h) recording one or more of the results;
   (i) transmitting one or more of the results;
   (j) presenting one or more of the results on a computer monitor;
   (k) configuring one or more results with explanatory textual material;
   (l) configuring one or more results with explanatory audio material;
   (m) configuring one or more results with explanatory visual material;
   (n) configuring one or more results with explanatory graphics;
   (o) configuring one or more results into pie charts;
   (p) configuring one or more results into bar graphs;
   (q) configuring one or more results into time lines;
   (r) ranking one or more of the results for each of the other chillers;
   (s) providing access to one or more results to a remote computer; and
   (t) presenting one or more results along with reference data.

66. The computer readable medium of claim 65, wherein at least two of the group are selected.

67. The computer readable medium of claim 64, wherein the communicating step is selected from from the group consisting of:
   (a) presenting one or more results along with design specifications of the at least one other chiller;
   (b) presenting one or more results along with the total time over which real tonnage derivation data was collected;
   (c) presenting one or more results along with the total time over which real tonnage derivation data was collected, excluding designated time periods in which the evaporator tonnage exceeded the maximum design rated evaporator tonnage of the other chiller;
   (d) presenting one or more results along with the cost per unit of power data;
   (e) presenting one or more results along with the calendar time periods over which real tonnage derivation data was collected;
   (f) presenting one or more results along with explanation in a texual format;

(g) presenting one or more results along with explanation in an audio format; and (h) presenting one or more results along with explanation in a visual format.

68. The computer readable medium of claim 67, wherein at least two of the group are selected.

69. The computer readable medium of claim 46, wherein the number of other chillers is at least two.

70. The computer readable medium of claim 46, wherein at least one of the other chillers is design rated such that it is equivalent to the design rated performance of the first chiller with respect to power requirements.

71. The computer readable medium of claim 46, wherein the real tonnage derivation data includes data for the evaporator fluid flow rate, the temperature of the evaporator fluid entering the evaporator, the temperature of the evaporator fluid leaving the evaporator, and the specific heat of the evaporator fluid.

72. The computer readable medium of claim 71, wherein the evaporator fluid flow rate, the temperature of the evaporator fluid entering the evaporator, and the temperature of the evaporator fluid leaving the evaporator, are measured, and the specific heat of the evaporator fluid is predetermined.

73. The computer readable medium of claim 46, wherein the evaporator fluid is water.

74. The computer readable medium of claim 46, wherein the evaporator fluid is not water.

75. The computer readable medium of claim 46, wherein at least some of the real tonnage derivation data is stored prior to access.

76. The computer readable medium of claim 46, wherein the obtaining real power usage data and real tonnage derivation data step further comprises the step of measuring the data during chiller operation.

77. The computer readable medium of claim 76, wherein the measuring step further comprises the step of storing the data for future access.

78. The computer readable medium of claim 76, wherein the measuring step further comprises the step of accessing the data for real time derivation and economic differentiation.

79. The computer readable medium of claim 78, wherein the measuring step further comprises the step of accessing the data for real time communication.

80. The computer readable medium of claim 76, wherein the measuring step further comprises the step of measuring additional chiller performance data.

81. The computer readable medium of claim 80, wherein the additional chiller performance data measuring step is selected from the group consisting of:

(a) measuring the condenser fluid flow rate;

(b) measuring the temperature of the condenser fluid entering the condenser;

(c) measuring the temperature of the condenser fluid leaving the condenser;

(d) measuring the temperature of the evaporator refigerant;

(e) measuring the temperature of the condenser refigerant;

(f) measuring the temperature of the supply oil to the compressor;

(g) measuring the pressure of the evaporator refigerant;

(h) measuring the pressure of the condenser refigerant; and (i) measuring chiller vibration.

82. The computer readable medium of claim 81, wherein at least two of the group are selected.

83. The computer readable medium of claim 80, wherein the additional chiller performance data measuring step further comprises selectively accessing such data for real time derivation and communication.

84. The computer readable medium of claim 46, further comprising the step of obtaining selection input by which the at least one other chillers for comparison is selected for economic differentiation.

85. The computer readable medium of claim 46, wherein the power cost difference deriving step further comprises the steps of:

(a) for the first chiller, deriving a representative evaporator tonnage for each designated time period, from the real tonnage derivation data for such designated time period; and (b) determining the difference in power requirements between the first chiller and at least one of the other chillers for each designated time period, from the representative evaporator tonnage, the real power usage data, and the design rated power requirements for the at least one other chiller.

86. The computer readable medium of claim 46, wherein the step of deriving the power cost difference further comprises the steps of:

(a) multiplying the cost of power per unit of power times the actual amount of power used over an extended time period, the extended time period including two or more designated time periods;

(b) deriving the hypothetical power cost for the at least one other chiller for each designated time period in the extended time period, and summing such costs over the extended time period; and (c) determining the difference between the actual power cost and the summed hypothetical costs.

87. A computer readable medium containing program instructions for execution on a computer system, which when executed by a computer, cause the computer system to perform method steps for economically analyzing the performance of an operating first chiller with respect to the hypothetical design rated performance of at least two other chillers, the method comprising the steps of:

(a) for the first chiller and for each of at least one designated time periods, obtaining at least one set of real tonnage derivation data, real power usage data, and cost per unit of power data;

(b) obtaining other chiller information, including design rating information for at least two of the other chillers, the design rating information for each of the at least two chillers including the design rated power requirement;

(c) deriving the power cost difference to operate the first chiller compared to the operation of at least one sequenced combination of at least two of the other chillers; and (d) economically differentiating the future use of the first chiller with respect to the hypothetical future use of the at least one sequenced combination of the at least two other chillers.

88. The computer readable medium of claim 87, wherein the obtaining other chiller information step further comprises the. step of inputing the selection of the at least two other chillers in the combination.

89. The computer readable medium of claim 88, wherein the inputing the selection step further comprises the step of inputing the order in which the at least two other chillers in the selected combination will be utilized in operation.

90. The computer readable medium of claim 87, wherein the number of sequenced combinations is at least two.

91. A system for economically analyzing the performance of an operating first chiller with respect to the hypothetical design rated performance of at least one other chiller, comprising:

(a) for the first chiller and for each of at least one designated time periods, means for obtaining at least one set of real tonnage derivation data, real power usage data, and cost per unit of power data;

(b) means for obtaining other chiller information, including design rating information for each of the other chillers, the design rating information the design rated power requirement;

(c) means for deriving the power cost difference to operate the first chiller compared to at least one of the other chillers; and (d) means for economically differentiating the future use of the first chiller with respect to the hypothetical future use of the at least one other chiller.

92. The system of claim 91 wherein, if the design rated power requirement for the other chiller is a function of the evaporator tonnage, then the means for deriving the power cost difference further comprises means for deriving the appropriate design rated power requirement for each designated time period based on the evaporator tonnage for such designated time period.

93. The system of claim 91 wherein:

(a) the means for obtaining other chiller information further comprises means for obtaining the design rated maximum evaporator tonnage for the at least one other chiller;

(b) the means for obtaining real tonnage derivation data and real power usage data further comprises means for obtaining such data over an extended time period, the extended time period including at least two designated time periods; and (c) the means for deriving the power cost difference further comprises (1) means for determining a representative evaporator tonnage for each designated time period from the real evaporator tonnage equation data, (2) means for comparing each such representative evaporator tonnage to the design rated maximum evaporator tonnage for the at least one other chiller, and (3) means for excluding from consideration all designated time periods in which the representative evaporator tonnage exceeded such design rated maximum evaporator tonnage for the at least one other chiller.

94. The system of claim 91 wherein:

(a) the means for obtaining other chiller information further comprises means for obtaining the design rated maximum evaporator tonnage for the at least one other chiller;

(b) the means for obtaining real tonnage derivation data and real power usage data further comprises means for obtaining such data over an extended time period, the extended time period including at least two designated time periods; and (c) the means for deriving the power cost difference further comprises (1) means for determining a representative evaporator tonnage for each designated time period from the real evaporator tonnage equation data, (2) means for comparing each such representative evaporator tonnage to the design rated maximum evaporator tonnage for the at least one other chiller, and (3) means for excluding from consideration all designated time periods in which the representative evaporator tonnage substantially exceeded such design rated maximum evaporator tonnage for the at least one other chiller.

95. The system of claim 91 wherein the means for deriving the power cost difference further comprises:

(a)(1) means for deriving a representative cost to operate the first chiller for each designated time period, and (2) means for summing such costs over an extended time period, the extended time period including two or more designated time periods;

(b)(1) means for deriving the hypothetical power cost of the at least one other chiller for each designated time period in the extended time period, and (2) means for summing such costs over the extended time period; and (c) means for determining the difference between the summed actual costs and the summed hypothetical costs.

96. The system of claim 95, wherein:

(a) the means for obtaining other chiller information, further comprises means for obtaining the design rated maximum evaporator: tonnage for the at least one other chiller;

(b) the means for deriving a representative cost further comprises means for deriving a representative evaporator tonnage for each designated time period;

(c) the means for summing the representative power cost used by the first chiller for each designated time period over an extended time period, further comprises (1) means for comparing the representative evaporator tonnage to such design rated maximum evaporator tonnage, and (2) means for excluding from the extended period of time all designated time periods where the representative evaporator tonnage exceeds the design rated maximum evaporator tonnage, such that the extended time period only includes designated time periods for which the representative evaporator tonnage is less than or equal to the design rated maximum evaporator tonnage.

97. The system of claim 96, wherein the economically differentiating means is selected from the group consisting of:

(a) means for determining the time at which the power cost difference equals the cost to replace the first chiller with the at least one other chiller;

(b) means for determining the power cost differences between the first chiller and each of at least two of the other chillers;

(c) means for determining, from the power cost differences between the first chiller and each of at least two of the other chillers, which of the other chillers has the lowest hypothetical operating cost;

(d) means for determining the rate of return on an investment equal to the cost of replacing the first chiller with the at least one other chiller, the income on the investment being equal to the actual and hypothetical power cost difference over a future period of time;

(e)(1) means for determining the power cost differences between the first chiller and each of at least two of the other chillers, and (2) means for determining the rates of return for at least two investments wherein each investment equals the cost of replacing the first chiller with one of the at least two other chillers, the income on each such investment being equal to the power cost difference derived for such chiller over a future period of time. and (2) means for ranking the rates of return so determined;

(f)(1) means for determining the power cost differences between the first chiller and each of at least two of the other chillers, (2) means for determining the rates of return for at least two investments wherein each investment equals the cost of replacing the first chiller with one of the at least two other chillers, the income on each such investment being equal to the power cost difference derived for such chiller over a future period of time. and (3) means for ranking the rates of return so determined;

(g) means for determining cost savings over future periods of time, the cost savings being generated by the power cost difference between the first chiller and the at least one other chiller;

(h) means for determining the net present value of power cost savings over future periods of time, the cost savings being generated by the power cost difference between the first chiller and the at least one other chiller; and (i) means for determining the net present value of power cost savings over future periods of time, the cost savings being generated by the power cost difference between the first chiller and the at least one other chiller, the power cost savings being reduced by the cost of replacing the first chiller with such chiller.

98. The system of claim 97, wherein at least two of the group are selected.

99. The system of claim 96, wherein the economically differentiating means further comprises:

(a) means for determining the power cost differences between the first chiller and each of at least two of the other chillers; and (b) means for ranking the at least two other chillers in order of the power cost difference.

100. The system of claim 96, wherein the economically differentiating means further comprises:

(a) means for determining the power cost differences between the first chiller and each of at least two other chillers; and (b) means for ranking the at least two other chillers in order of the amount of time each such chiller's power cost difference would equal the cost to replace the first chiller with such chiller.

101. The system of claim 91 wherein the economically differentiating means further comprises converting the power cost difference into a power cost difference per unit of time.

102. The system of claim 101, wherein the unit of time used in the converting means is selected from the group consisting of hours, days, weeks, months, years, the designated time period, and integer multiples of the designated time period.

103. The system of claim 91 wherein the means for deriving the power cost difference further comprises means for determining a representative cost of power and a representative evaporator tonnage for each designated time period.

104. The system of claim 103, wherein the number of sets of real tonnage derivation data for each designated time period is two or more, the representative evaporator tonnage is the average of the derived evaporator tonnages for each such set, the real power usage data includes a datum for each set of real tonnage derivation data, each datum coinciding with one set of real tonnage derivation data, and the representative cost for a designated time period is based on the average of all real power usage data from the designated time period.

105. The system of claim 91 wherein the economically differentiating means is selected from the group consisting of:

(a) means for determining the time at which the power cost difference equals the cost to replace the first chiller with the at least one other chiller;

(b) means for determining the power cost differences between the first chiller and each of at least two of the other chillers;

(c) means for determining, from the power cost differences between the first chiller and each of at least two of the other chillers, which of the other chillers has the lowest hypothetical operating cost;

(d) means for determining the rate of return on an investment equal to the cost of replacing the first chiller with the at least one other chiller, the income on the investment being equal to the actual and hypothetical power cost difference over a future period of time;

(e)(1) means for determining the power cost differences between the first chiller and each of at least two of the other chillers, and (2) means for determining the rates of return for at least two investments wherein each investment equals the cost of replacing the first chiller with one of the at least two other chillers, the income on each such investment being equal to the power cost difference derived for such chiller over a future period of time. and (2) means for ranking the rates of return so determined;

(f)(1) means for determining the power cost differences between the first chiller and each of at least two of the other chillers, (2) means for determining the rates of return for at least two investments wherein each investment equals the cost of replacing the first chiller with one of the at least two other chillers, the income on each such investment being equal to the power cost difference derived for such chiller over a future period of time. and (3) means for ranking the rates of return so determined;

(g) means for determining cost savings over future periods of time, the cost savings being generated by the power cost difference between the first chiller and the at least one other chiller;

(h) means for determining the net present value of power cost savings over future periods of time, the cost savings being generated by the power cost difference between the first chiller and the at least one other chiller; and (i) means for determining the net present value of power cost savings over future periods of time, the cost savings being generated by the power cost difference between the first chiller and the at least one other chiller, the power cost savings being reduced by the cost of replacing the first chiller with such chiller.

106. The system of claim 105, wherein at least two of the group are selected.

107. The system of claim 91 wherein the economically differentiating means further comprises:

(a) means for determining the power cost differences between the first chiller and each of at least two of the other chillers; and (b) means for ranking the at least two other chillers in order of the power cost difference.

108. The system of claim 91 wherein the economically differentiating means further comprises:

(a) means for determining the power cost differences between the first chiller and each of at least two other chillers; and (b) means for ranking the at least two other chillers in order of the amount of time each such chiller's power cost difference would equal the cost to replace the first chiller with such chiller.

109. The system of claim 91 further comprising the means for communicating the results of the economic differentiation.

110. The system of claim 100 wherein the communicating means is selected from the group consisting of:
(a) means for graphing one or more of the results;
(b) means for tabling one or more of the results;
(c) means for displaying one or more of the results;
(d) means for monitoring one or more of the results;
(e) means for compiling one or more of the results;
(f) means for printing one or more of the results;
(g) means for storing one or more of the results;
(h) means for recording one or more of the results;
(i) means for transmitting one or more of the results;
(j) means for presenting one or more of the results on a computer monitor;
(k) means for configuring one or more results with explanatory textual material;
(l) means for configuring one or more results with explanatory audio material;
(m) means for configuring one or more results with explanatory visual material;
(n) means for configuring one or more results with explanatory graphics;
(o) means for configuring one or more results into pie charts;
(p) means for configuring one or more results into bar graphs;
(q) means for configuring one or more results into time lines;
(r) means for ranking one or more of the results for each of the other chillers;
(s) means for providing access to one or more results to a remote computer; and
(t) means for presenting one or more results along with reference data.

111. The system of claim 110, wherein at least two of the group are selected.

112. The system of claim 109, wherein the communicating means is selected from from the group consisting of:
(a) means for presenting one or more results along with design specifications of the at least one other chiller;
(b) means for presenting one or more results along with the total time over which real tonnage derivation data was collected;
(c) means for presenting one or more results along: with the total time over which real tonnage derivation data was collected, excluding designated time periods in which the evaporator tonnage exceeded the maximum design rated evaporator tonnage of the other chiller;
(d) means for presenting one or more results along with the cost per unit of power data;
(e) means for presenting one or more results along with the calendar time periods over which real tonnage derivation data was collected;
(f) means for presenting one or more results along with explanation in a texual format;
(g) means for presenting one or more results along with explanation in an audio format; and
(h) means for presenting one or more results along with explanation in a visual format.

113. The system of claim 112, wherein at least two of the group are selected.

114. The system of claim 91 wherein the number of other chillers is at least two.

115. The system of claim 91 wherein at least one of the other chillers is design rated such that it is equivalent to the design rated performance of the first chiller with respect to power requirements.

116. The system of claim 91 wherein the real tonnage derivation data includes data for the evaporator fluid flow rate, the temperature of the evaporator fluid entering the evaporator, the temperature of the evaporator fluid leaving the evaporator, and the specific heat of the evaporator fluid.

117. The system of claim 116, wherein the evaporator fluid flow rate, the temperature of the evaporator fluid entering the evaporator, and the temperature of the evaporator fluid leaving the evaporator, are measured, and the specific heat of the evaporator fluid is pre-determined.

118. The system of claim 91 wherein the evaporator fluid is water.

119. The system of claim 91 wherein the evaporator fluid is not water.

120. The system of claim 91 wherein at least some of the real tonnage derivation data is stored prior to access.

121. The system of claim 91 wherein the means for obtaining real power usage data and real tonnage derivation data means further comprises means for measuring the data during chiller operation.

122. The system of claim 121, wherein the measuring means further comprises means for storing the data for future access.

123. The system of claim 121, wherein the measuring means further comprises means for accessing the data for real time derivation and economic differentiation.

124. The system of claim 123, wherein the measuring means further comprises means for accessing the data for real time communication.

125. The system of claim 121, wherein the measuring means further comprises means for measuring additional chiller performance data.

126. The system of claim 125, wherein the additional chiller performance data measuring means is selected from the group consisting of:
(a) means for measuring the condenser fluid flow rate;
(b) means for measuring the temperature of the condenser fluid entering the condenser;
(c) means for measuring the temperature of the condenser fluid leaving the condenser;
(d) means for measuring the temperature of the evaporator refigerant;
(e) means for measuring the temperature of the condenser refigerant;
(f) means for measuring the temperature of the supply oil to the compressor;
(g) means for measuring the pressure of the evaporator refigerant;
(h) means for measuring the pressure of the condenser refigerant; and
(i) means for measuring chiller vibration.

127. The system of claim 126, wherein at least two of the group are selected.

128. The system of claim 125, wherein the additional chiller performance data measuring means further comprises selectively accessing such data for real time derivation and communication.

129. The system of claim 91 further comprising means for obtaining selection input by which the at least one other chillers for comparison is selected for economic differentiation.

130. The system of claim 91 wherein the power cost difference deriving means further comprises:
  (a) for the first chiller, means for deriving a representative evaporator tonnage for each designated time period, from the real tonnage derivation data for such designated time period; and
  (b) means for determining the difference in power requirements between the first chiller and at least one of the other chillers for each designated time period, from the representative evaporator tonnage, the real power usage data, and the design rated power requirements for the at least one other chiller.

131. The system of claim 91 wherein the means for deriving the power cost difference further comprises:
  (a) means for multiplying the cost of power per unit of power times the actual amount of power used over an extended time period, the extended time period including two or more designated time periods;
  (b) means for deriving the hypothetical power cost for the at least one other chiller for each designated time period in the extended time period, and summing such costs over the extended time period; and
  (c) means for determining the difference between the actual power cost and the summed hypothetical costs.

132. A system for economically analyzing the performance of an operating first chiller with respect to the hypothetical design rated performance of at least two other chillers, comprising:
  (a) for the first chiller and for each of at least one designated time periods, means for obtaining at least one set of real tonnage derivation data, real power usage data, and cost per unit of power data;
  (b) means for obtaining other chiller information, including design rating information for at least two of the other chillers, the design rating information for each of the at least two chillers including the design rated power requirement;
  (c) means for deriving the power cost difference to operate the first chiller compared to the operation of at least one sequenced combination of at least two of the other chillers; and
  (d) means for economically differentiating the future use of the first chiller with respect to the hypothetical future use of the at least one sequenced combination of the at least two other chillers.

133. The system of claim 132, wherein the obtaining other chiller information means further comprises means for inputting the selection of the at least two other chillers in the combination.

134. The system of claim 133, wherein the inputting the selection means further comprises means for inputting the order in which the at least two other chillers in the selected combination will be utilized in operation.

135. The system of claim 132, wherein the number of sequenced combinations is at least two.

* * * * *